(No Model.)
T. O. CUTLER.
GRINDING MILL.
No. 281,030. Patented July 10, 1883.
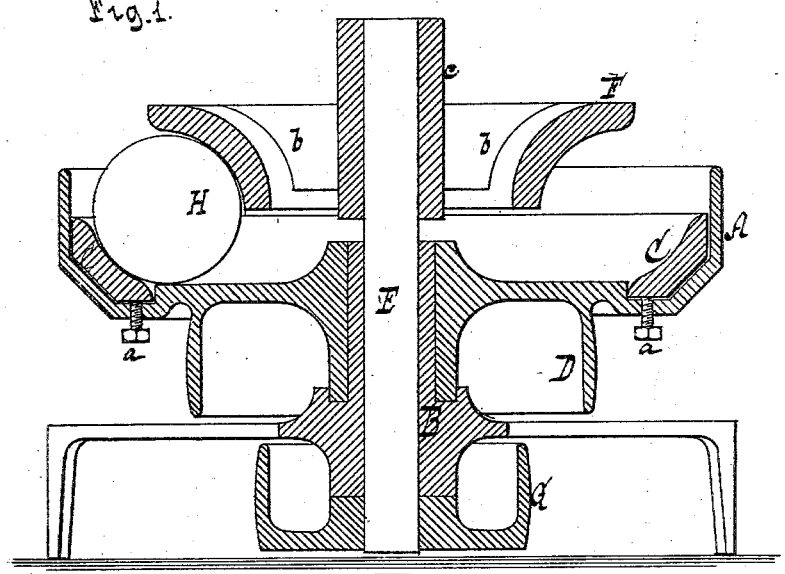
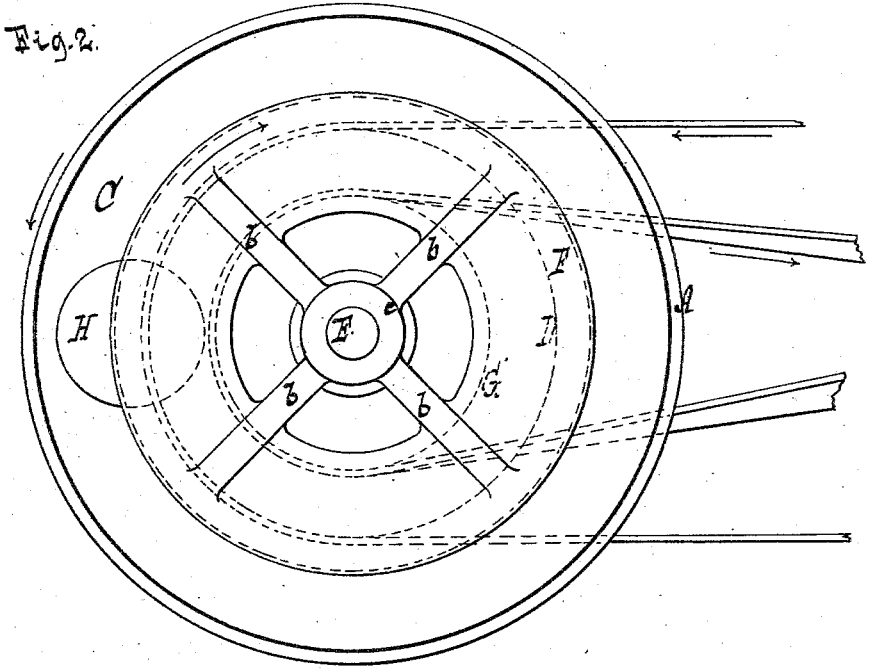
WITNESSES:
Otto Hufeland
William Miller
INVENTOR
Thomas O. Cutler
BY Van Santvoord & Hauff
ATTORNEYS

United States Patent Office.

THOMAS O. CUTLER, OF JERSEY CITY, NEW JERSEY.

GRINDING-MILL.

SPECIFICATION forming part of Letters Patent No. 281,030, dated July 10, 1883.

Application filed December 13, 1882. (No model.)

*To all whom it may concern:*

Be it known that I, THOMAS O. CUTLER, a citizen of the United States, residing at Jersey City, in the county of Hudson and State of New Jersey, have invented new and useful Improvements in Grinding-Mills, of which the following is a specification.

This invention has for its object to provide an improved grinding-machine; and it consists in the novel construction and combination of parts hereinafter described and claimed.

This invention is illustrated in the accompanying drawings, in which Figure 1 represents a vertical central section. Fig. 2 is a plan or top view.

Similar letters indicate corresponding parts.

In the drawings, the letter A designates a pan, which is circular in form and mounted on a stationary hollow shaft or pin, B, so that it can be freely revolved in either direction. Into the outer bottom edge of the pan is fitted a ring, C, made of chilled cast-iron or other equivalent material. The inner surface of this ring is concave, and said ring is exposed to the action of set-screws $a$, so that its position can be adjusted, if desired. On the bottom of the pan is formed a pulley, D, which serves to impart to pan a revolving motion.

E is a vertical spindle, which extends through the hollow shaft B. On the upper end of this vertical spindle is mounted the pressure-rim F, and on its lower end the pulley G, so that by means of a belt passing round this pulley a revolving motion can be imparted to the pressure-rim. This pressure-rim is made of chilled cast-iron or other equivalent material, and it is provided with arms $b$ and a hub, $c$, said hub being bored out to fit the spindle E. The pressure-rim is provided with a concave bearing-surface, which is intended to act upon one or more balls, H, placed into the pan A, as shown in the drawings, the action of the pressure-rim being such that it forces the ball or balls outward into the concave surface of the ring C. By referring to Fig. 1 it will be seen that the pressure-rim acts upon the ball H by its inherent gravity, and if greater pressure is required additional weights may be placed on the pressure-rim. The revolving motion imparted to the pan is in a direction opposite to that imparted to the pressure-rim; and the speed of the pan is limited, since, if it becomes too rapid, the material contained therein is liable to be thrown out by the centrifugal force, while the speed of the pressure-rim may be increased to any point best adapted to produce the desired result. By the action of the pan and of the pressure-rim a revolving motion is imparted to the ball or balls H, and, since the speed of this motion is different from that of the pan, the ball or balls produce a grinding action upon the material in the pan, while at the same time by the revolving motion of the pan the material to be ground is automatically carried outward, so as to be exposed to the grinding action of the ball or balls.

If desired, that portion of the bottom of the pan next to the ring C may be made in the form of a sieve, so that the material which has been reduced to the required fineness can escape automatically, and in that case a suitable chute will be provided to carry the ground material which has passed through the sieve into a suitable receiver.

The pressure-rim may be made separate from its arms, and secured to the same by set-screws or any suitable means.

The revolving motion of the pan and pressure-rim may be produced by belts and pulleys, as shown, or by cog-wheels or other equivalent means.

For dry grinding a dust-exhauster will be combined with the pan A, and in this case it is important to have the driving-power applied below.

What I claim as new, and desire to secure by Letters Patent, is—

1. The combination of a pan, a vertical shaft supporting the pan, and on which it is capable of revolving, a device for revolving the pan in a horizontal plane, a ball arranged to rotate and to travel around the pan, a pressure-rim resting on the ball, a vertical shaft supporting the said rim, and a device for revolving the rim in a direction opposite to that in which the pan revolves, the revolution of the pan serving to automatically carry the material toward the periphery of the pan, where it is acted on by the ball, substantially as described.

2. The combination, substantially as hereinbefore described, of the pan, A, mounted on a hollow shaft or pin, B, the pulley D, connected to the pan, the spindle E, extending through the hollow shaft B, the pressure-rim F, mounted on the upper end of the spindle E, the pulley G, mounted on the lower end of said shaft, and the ball H, placed into the pan and exposed to the action of the pressure-rim.

3. The combination, substantially as hereinbefore described, of the pan, the concave ring C, fitted into said pan, the set-screws for adjusting said ring, the pressure-rim, a ball placed into the pan and exposed to the action of the pressure-rim, and mechanism for imparting to the pan and to the pressure-rim a revolving motion in opposite directions.

In testimony whereof I have hereunto set my hand and seal in the presence of two subscribing witnesses.

THOMAS O. CUTLER. [L. S.]

Witnesses:
W. HAUFF,
E. F. KASTENHUBER.